United States Patent
Laser

[19]

[11] Patent Number: 5,773,808

[45] Date of Patent: Jun. 30, 1998

[54] METHOD AND APPARATUS FOR READING INVISIBLE MESSAGES

[76] Inventor: Vadim Laser, 9876 Zig Zag Rd., Cincinnati, Ohio 45242

[21] Appl. No.: 650,925

[22] Filed: May 17, 1996

[51] Int. Cl.⁶ .................................................. G06K 7/10
[52] U.S. Cl. .......................................... 235/462; 235/468
[58] Field of Search ................................. 235/468, 462, 235/472

[56] References Cited

U.S. PATENT DOCUMENTS

| | | |
|---|---|---|
| 3,473,027 | 10/1969 | Freeman et al. . |
| 3,801,782 | 4/1974 | Dorion . |
| 4,282,425 | 8/1981 | Chadima, Jr. et al. . |
| 4,570,057 | 2/1986 | Chadima, Jr. et al. . |
| 4,642,526 | 2/1987 | Hopkins . |
| 4,758,717 | 7/1988 | Shepard et al. . |
| 4,766,300 | 8/1988 | Chadima, Jr. et al. . |
| 4,894,523 | 1/1990 | Chadima, Jr. et al. . |
| 4,983,817 | 1/1991 | Dolash et al. . |
| 5,021,642 | 6/1991 | Chadima, Jr. et al. . |
| 5,081,343 | 1/1992 | Chadima, Jr. et al. . |
| 5,095,197 | 3/1992 | Chadima, Jr. et al. . |
| 5,118,349 | 6/1992 | Jalon . |
| 5,144,119 | 9/1992 | Chadima, Jr. et al. . |
| 5,144,121 | 9/1992 | Chadima, Jr. et al. . |
| 5,182,441 | 1/1993 | Chadima, Jr. et al. . |
| 5,187,355 | 2/1993 | Chadima, Jr. et al. . |
| 5,187,356 | 2/1993 | Chadima, Jr. et al. . |
| 5,218,191 | 6/1993 | Chadima, Jr. et al. . |
| 5,220,166 | 6/1993 | Takeuchi et al. . |
| 5,233,172 | 8/1993 | Chadima, Jr. et al. . |
| 5,258,606 | 11/1993 | Chadima, Jr. et al. . |
| 5,288,985 | 2/1994 | Chadima, Jr. et al. . |
| 5,380,992 | 1/1995 | Damen et al. . |
| 5,401,960 | 3/1995 | Fisum et al. .................. 235/468 X |
| 5,414,258 | 5/1995 | Liang . |
| 5,471,281 | 11/1995 | Hayashi et al. . |
| 5,525,798 | 6/1996 | Berson et al. .................. 235/468 X |

Primary Examiner—Donald T. Hajec
Assistant Examiner—Karl Frech
Attorney, Agent, or Firm—Dinsmore & Shohl LLP

[57] ABSTRACT

An apparatus and method for reading invisible messages is disclosed. Two light sources impinge upon a surface upon which a luminescent message is located. The first light excites the luminescent message, which luminesces and emits a luminescent light. The luminescent light is received by an image sensor and is converted into a first electric signal. The second light has wavelengths substantially similar to the luminescent light, which reflects from the surface and is received by an image sensor and converted to a second electric signal. The first and second signals are processed to compensate for local variations in the reflectivity of the surface.

36 Claims, 3 Drawing Sheets

METHOD AND APPARATUS FOR READING INVISIBLE MESSAGES

TECHNICAL FIELD

The present invention relates generally to optical message readers, and will be specifically disclosed as a method and apparatus for reading messages that luminesce.

BACKGROUND

Optical message readers are ever increasingly being used throughout our society. Whether they are bar code readers used in grocery stores, alphanumeric character readers used in business, 2-D or 3-D block code readers used in industry, etc., optical message readers provide the significant benefits of accuracy, speed and automation.

Often, it is desirable that messages be invisible to the naked human eye. For instance, the bar codes on packaging that contain information relating to the product and its pricing could be printed with invisible ink directly over a product label. Doing so would eliminate the undesirable black and white bar codes found on many labels today. Invisible messages could also be used by postal sorters or financial institutions to mark letters or checks with information while not visibly cluttering the letters or checks with extraneous information. Beyond aesthics, invisible messages also have more practical applications. For example, in paper manufacturing it is desirable to have certain information printed on blank paper rolls, however, it is undesirable to have the paper visibly marked. Additionally, when invisible messages are used in conjunction with visible messages, more information can be stored in the same space. Invisible messages can also add a level of security to the information contained in the message. Beyond these few examples, there are numerous other applications for invisible messages.

Invisible messages can be printed using luminescent or phosphorescent ink. Upon excitation by certain wavelengths of light, luminescent (sometimes referred to a fluorescent) inks will emit a different wavelength of light. For instance, certain luminescent inks are invisible to the naked human eye, but upon being excited by a black light (the ultraviolet band of wavelengths), the ink will emit a certain visible color (e.g. orange, red, green etc.). On the other hand, phosphorescent ink will store light energy and emit light for a finite duration after the excitation light has terminated. Phosphorescent inks often emanate light at a different wavelength than the excitation light. Luminescent or phosphorescent inks (hereinafter collectively referred to as "luminescent," unless specifically differentiated) can be invisible to the naked human eye in either the excited state, non-excited state, or both.

Local changes in the reflectivity of the surface upon which a luminescent message is printed can distort the luminescent light from the message and hamper the recognition of the message. For instance, if a luminescent bar code is printed over black and white text, the luminescent light emitted from the ink printed over the black portions of the text will be relatively weak because black surfaces will tend to absorb the luminescent light. On the other hand, more luminescent light will emit where the luminescent ink is printed over the white portions of the surface because white tends to reflect light.

One message reader adapted to read luminescent messages is disclosed in U.S. Pat. No. 4,983,817 to Dolash et al.. In essence, the Dolash reader has a mechanically scanning light (e.g. a laser) that traverses the message to excite the luminescent ink. The Dolash reader generates two electric signals to attempt to compensate for local variations in the reflectivity of the surface. A first filter allows only wavelengths corresponding, to the luminescent light to pass onto a first photoelectric sensor to generate a first signal, and a second filter blocks the wavelengths corresponding to the luminescent light to generate a second signal by a second photoelectric sensor. Using Dolash's assumptions, the first signal represents the luminescent light with the reflectivity variations, and the second signal represents the variations in reflectivity of the surface. The first and second signals are processed to generate an output signal that in theory is independent of the variations in reflectivity.

The Dolash reader has several drawbacks and inaccuracies, four of which are summarized below. First, the Dolash reader fails to compensate for reflectivity variations in the surface for wavelengths corresponding to the luminescent light. Surface reflectivity varies dependent upon the wavelength of light striking the surface. For instance, assume that a luminescent light is red and the excitation wavelength is blue. If the luminescent message is printed over a red background, the red luminescent light will tend to be reflective against the red surface thus producing a strong first signal. The blue excitation light will tend to be absorbed by the surface thus producing a weak second signal. Since the Dolash reader will erroneously compensate for low reflectivity, the output signal would be inaccurate. Second, the light source in the Dolash reader is scanned over the surface. Scanning requires moving parts, whether it be a rotating mirror or an oscillating light source, which are prone to wear and misalignment, and generally increase the cost of the components. Third, since the light source is scanned, the Dolash reader is ill-suited for high speed applications. For instance, in an application where the surface is rapidly moving under the scanner, such as in an industrial paper processing machine, the message would move out from under the Dolash reader before the beam could traverse the message. Fourth, since the Dolash reader uses a scanning beam, it is limited to 1-D bar codes, and is inapplicable for reading 2-D or 3-D messages, such as alphanumeric characters and area-type block codes.

Thus, there is a need for method and apparatus from reading invisible messages that do not contain the aforementioned problems.

SUMMARY OF THE INVENTION

Accordingly, an object of this invention is to provide an improved method and apparatus for reading invisible messages.

An additional object of this invention is to provide a method and apparatus for reading luminescent messages that compensate for local variations in the reflectivity of the surface for wavelengths corresponding to the luminescent light from the message.

Another object of this invention is to provide a method and apparatus for reading luminescent messages that compensate for local variations in the reflectivity of the surface for wavelengths corresponding to the light that excites a luminescent message. A further object of this invention is to provide a method and apparatus for reading luminescent messages printed on a rapidly moving surface.

Yet another object of this invention is to provide a method and apparatus capable of reading 1-D, 2-D, and 3-D luminescent messages.

Still a further object of the invention is to provide an apparatus for reading luminescent messages without moving parts.

Additional objects, advantages, and novel features of the invention will be set forth in part in the description that follows and in part will become apparent to those skilled in the art upon examining or practicing the invention. The objects and advantages of the invention may be realized and obtained by means of the instrumentalities and combinations particularly pointed out in the appended claims.

One embodiment of the present invention is an apparatus that comprises a first strobe light that produces a first incident light to impinge upon a surface. The first incident light includes wavelengths that cause a message on the surface to luminesce, but substantially excludes the wavelengths corresponding to the luminescent light. A second strobe light produces a second incident light that impinges upon the surface, which substantially excludes wavelengths that cause the message to luminesce. Preferably, the second incident light substantially corresponds to the wavelengths of the luminescent light. A focusing assembly receives the reflected and luminescent light from the surface and focuses it into images. One or more image sensors receive the images and convert them into electric signals. A controlling system controls the first and second strobe lights and the one or more image sensors, such that when the first strobe light is on a first image is converted to a first electric signal, and when the second strobe light is on a second image is converted to a second electrical signal. A processing system receives and processes the two electric signals.

Still other aspects of the present invention will become apparent to those skilled in the art from the following description of a preferred embodiment, which is simply by way of illustration one of the best modes contemplated for carrying out the invention. As will be realized, the invention is capable of other different obvious aspects all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and together with their description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

Message readers, whether in the form of bar code readers, alphanumeric character readers, or 2-D and 3-D block code readers, are every increasingly being used throughout our society. Often, it is desirable that the messages be invisible to the naked human eye, but nevertheless perceivable by the message reader. This can be achieved by using luminescent ink, which upon being excited by a certain wavelength of light, emits a different wavelength light. Since the surfaces upon which luminescent messages are printed often have local variations in reflectivity (e.g. the luminescent message being printed over a series of visible markings or labels), it is desirable that a luminescent message reader be able to compensate for such variations.

Figure 1:
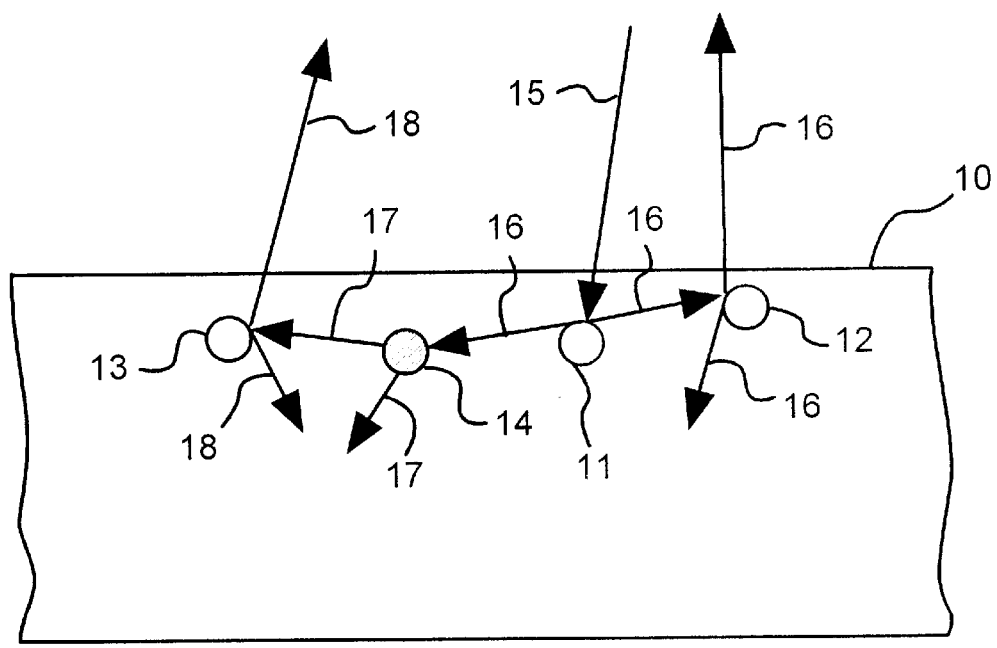
FIG. 1 illustrates the interaction between excitation light, luminescent light, and the surface upon which a luminescent message is printed.

The interaction between excitation light, luminescent light, and the surface upon which a luminescent message is printed is depicted in FIG. 1. A surface 10 includes thousands of molecules, however, for the purposes of illustration only four molecules 11, 12, 13, 14 are shown in FIG. 1. Many of the molecules are background molecules 11, 12, 13, such as molecules of the surface material (e.g. paper), visible ink printed on the surface 10, or other such matter. Some of the molecules are luminescent molecules 14 belonging to the luminescent message.

As excitation radiation 15, usually in the form of light, strikes the surface 10, the energy of the light 15 penetrates and dissipates through the layers of molecules below the surface 10. The background molecules 11, 12, 13 reflect, dissipate and partially absorb light. For instance, upon striking the molecule 11, the excitation light 15 is dispersed as reflected excitation light 16. Some of the reflected light 16 will strike the background molecule 12 and some of the light will strike the luminescent molecule 14. The reflected light 16 that strikes molecule 12 could reflect outside the surface 10, or reflect into the surface 10 where it may eventually dissipate. The reflected excitation light 16 that strikes the luminescent molecule 14 will cause the molecule 14 to luminesce and produce luminescent light 17, which is often a different wavelength than the reflected excitation light 16. The majority of luminescent light 17 will strike other background molecules 13, which in turn will be reflected 18 outside or inside the surface 10. While some luminescent light 17 may directly leave the surface 10 without striking a background molecule 13, the amount of such light 17 is insignificant. Therefore, the light leaving the surface 10 is substantially limited to the reflected excitation light 16 and reflected luminescent light 18.

When an incident light strikes a non-luminescent molecule, some of the light is absorbed and some of the light is reflected. The reflectivity of molecules often varies dependent upon the wavelength of the incident light. For instance, red ink molecules tend to reflect portions of the incident light having wavelengths corresponding to the color red, and also tend to absorb the wavelengths of the incident light not corresponding to the color red. So, when a white incident light (white light has a broad range of wavelengths) strikes a red ink molecule, the majority of reflected light is red, and the molecule will appear red. On the other hand, some non-luminescent molecules substantially reflect and absorbed incident light in a uniform manner across a broad range of wavelengths. For example, white molecules tend to reflect a broad range of visible light, while black molecules tend to absorb the same range of light.

The interaction depicted in FIG. 1 can be represented by a mathematical model. While many different models or variations can be formulated to implement the principles behind the invention, the following model is used with one of the preferred embodiments. If $i_1$ is the intensity of the excitation light 15, and $i_2$ is the intensity of reflected excitation light 16, then $i_2$ can be calculated as $i_2 = i_1 * k_1$, where $k_1$ is the coefficient of reflectivity of the background material represented by the molecule 11 for light wavelengths corresponding to the excitation light 15. If $l_1$ is the intensity of the luminescent light 17, and n is the luminescent efficiency of the luminescent molecule 14, then $l_1 = i_2 * n$. If $l_2$ is the intensity of the reflected luminescent light 18, then $l_2$ can be calculated as $l_2 = l_1 * k_2$, where $k_2$ is the coefficient of reflectivity of the background material represented by the molecule 13 for light wavelengths corresponding to the luminescent light 17. Solving for $l_2$ results in the following mathematical model: $l_2 = i_1 * k_1 * k_2 * n$. Assuming the intensity of the excitation light $i_1$ and the luminescent efficiency n are known constants, the intensity of the luminescent light $l_2$ from the message is a function of $k_1$ and $k_2$.

Figure 2:
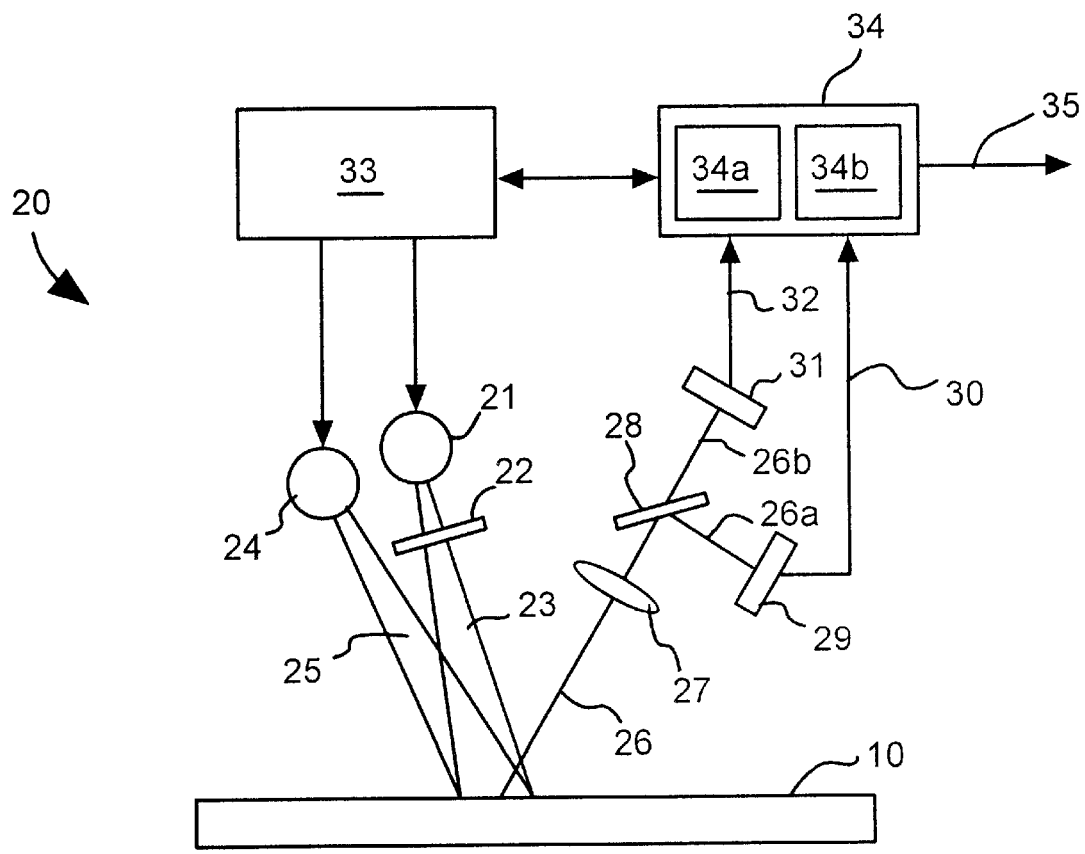
FIG. 2 depicts a luminescent message reader that compensates for local variations in the reflectivity of the surface.

FIG. 2 depicts a message reader 20 that can compensate for local variations in the reflectivity of the surface 10. Located on the surface 10 is a luminescent message, such as a bar code, alphanumeric characters, or 2-D and 3-D block codes. The message can be placed on the surface 10 as a positive image using luminescent ink, luminescent powders, or other suitable means, and the luminescent light produced by the message is preferably within the range from about 400 nm to about 5000 nm. Alternatively, the luminescent message could be a negative image if the surface has luminescent qualities, such as from fluorescent brighteners sometimes added to paper, and the ink used to print the invisible message absorbs wavelengths substantially corresponding to the excitation light 15.

The apparatus 20 has a strobe light 21 for producing an incident light 23 adapted to impinge upon the surface 10. The incident light 23 includes a set of wavelengths that cause the message to luminesce and produce a luminescent light 18. This set of wavelengths in the incident light 23 substantially excludes the wavelengths of the luminescent light 18. The term "substantially" is used to clarify that the majority of the light satisfy the wavelength band(s) described, even though some wavelengths in the set may not satisfy the described band(s). Preferably, the incident light 23 is substantially limited to wavelengths of light that excite the luminescent message. The set of wavelengths can be controlled by an optical filter 22 interposed between the strobe light 21 and the surface 10, which allows only selected wavelengths of light to pass, however other suitable means may be employed.

The message reader 20 also has a strobe light 24 for producing an incident light 25 to impinge upon the surface 10. The incident light 25 has a set of wavelengths that substantially excludes the wavelengths of light that cause the message to luminesce. Preferably, the incident light 25 substantially corresponds to the wavelengths of the luminescent light 18. One means for controlling the set of wavelengths in the incident light 25 is a filtering film over the strobe light 24. For instance, if the luminescent message is excited by ultraviolet light, the light 24 could have a film over the bulb that acts as filter to exclude ultraviolet light. However, other means, such as a series of optical filters, could be used.

A focusing assembly 27 is disposed in the optical path 26, which is used for focusing light from the surface 10 into images. Here, the focusing assembly 27 is a single lens, but other devices can be used, such parabolic mirrors, apertures, a series of lenses, etc. Preferably, the focusing assembly 27 has no moving parts, however, moving parts could be included to provide a variable focal depth. A dichroic mirror 28 is also disposed in the optical path 26. The mirror 28 splits light from the surface 10 into two beams 26a, 26b based on wavelengths of the light. The beam 26a includes the wavelengths of light that substantially correspond to the luminescent light 18, and the beam 26b includes all other wavelengths. An additional filter (not shown) could be disposed in the beam 26b which would exclude all wavelengths except those substantially corresponding to the excitation light 16.

The message reader 20 includes at least one image sensor for receiving images from the surface 10 and converting the images into electric signals. As shown in FIG. 2, the message reader 20 has two image sensors 29, 31, each having a plurality of photosensitive pixels, whereby light striking a particular pixel is converted into a separate electric signal. The image sensor is preferably a linear or area sensor. Suitable images sensors include charged coupled device ("CCD") sensors, charged injection device ("CID") sensors, complementary metal oxide semiconductor ("CMOS") sensors, or other 1-D (linear) or 2-D (area) image sensors. The image sensor 29 is designed for receiving an image from the beam 26a and converting the image into an electric signal 30. Similarly, the image senor 31 is designed for receiving an image from the beam 26b and converting the image into an electric signal 32.

A controlling system 33 controls the strobe lights 21, 24 and the image sensors 29, 31 such that when the strobe light 21 is on a first image is converted into the electric signal 30 by the image sensor 29. Preferably, an additional image can be converted into the electric signal 32 by the image sensor 31 also in response to tHe flash of the strobe light 21. When the strobe light 24 is on a second image is converted into the electric signal 32 by the image sensor 31. A processing system 34 receives and processes electric signals 30, 32. The processing system 34 can include analog circuitry for processing the signals, but preferably includes an analog to digital converter 34a and a digital processor 34b. When controlling the image sensors 29, 31, the controlling system 33 can directly prevent the generation of electric signals 30, 32 using a mechanical or electric shutter or other suitable means, influence the processing system 34 to selectively ignore certain electric signals 30, 32, or passively through the mirror 28 whereby only the desired wavelengths from the surface 10 strike the appropriate image sensors 29, 31. Preferably, the controlling system 33 controls the strobe lights 21, 24 such that the incident lights 23, 24 impinge upon the surface 10 at different times. In other words, when one light is on, the other is off. If the strobe lights 21, 24 are sequenced in rapid succession, the reader 20 could be used in high speed applications where the surface 10 is rapidly moving relative to the reader 20, assuming the two flashes sequence before the message moves out from under the reader 20.

Using the message reader 20, a luminescent message located on the surface 10 can be read with local variations in background reflectivity compensated. The controlling system 33 can trigger the strobe light 21 to flash while preventing the other strobe light 24 from illuminating. The incident light 23 will impinge upon the surface 10 and excite the luminescent message such that it produces a luminescent light 17. The reflected light 18 will emit along the optical path 26, pass through the focusing assembly 27, and then strike the dichroic mirror 28. Since the mirror 28 reflects wavelengths of light corresponding to the luminescent light 18, the light 18 will reflect along the beam 26a and an image from the surface 10 will be received by the image sensor 29. The resulting electric signal 30 will be received by the processing system 34 and will be proportional to $l_2$, or the luminescent message without background reflectivity compensation. Also as a result of the flash from the strobe light 21, reflected excitation light 16 will reflect from the surface 10, pass through the focusing assembly 27, and strike the mirror 28. Since this reflected light 16 will not have wavelengths corresponding to the luminescent light 18, the reflected light 16 will pass through the mirror 28 along the beam 26b, and an image will be received by the image sensor 31. Preferably, a resulting electric signal 32 will be received by the processing system 34 and will be proportional to $k_1$, or the coefficient of reflectivity of the surface 10 for wavelengths of light corresponding to the excitation light 15.

Next, the controlling system 33 can trigger the strobe light 24 to flash while preventing the other strobe light 21 from illuminating. The incident light 25 will strike the surface 10. Since the incident light 25 substantially excludes wavelengths that cause the message to luminesce, the message will not luminesce. The incident light 25 will reflect off the surface 10, pass through the focusing assembly 27, and strike the dichroic mirror 28. The wavelengths of the light that correspond to the luminescent light will reflect off the mirror along beam 26a, and an image will be received by the image sensor 29. The resulting electric signal 30 will be received by the processing system 34, and is proportional to $k_2$, or the coefficient of reflectivity of the surface 10 for wavelengths corresponding to the luminescent light 17. Any wavelengths of reflected light 25 not substantially similar to the luminescent light 18 will pass through the mirror 28 along the beam 26b, and an image will be received by the image sensor 31. Preferably, the controlling system 33 triggers a mechanical or electric shutter so no electric signal will result, or alternatively influence the processing system 34 to ignore the resulting electric signal 32. Preferably, the incident light 25 will substantially correspond to the wavelengths of the luminescent light 17, so the amount of light that would pass through the mirror 28 would be insignificant.

The processing system 34 will have received three electric signals: a first electric signal proportional to $l_2$, a second electric signal proportional to $k_2$, and a third electric signal proportional to $k_1$. As one with ordinary skill in the art will readily appreciate, the precise proportionality of the various electric signals can be calibrated, and the values for $i_1$ and n and be calculated in advance, so an output signal 35 can be generated to compensate for local variations in the reflectancy of the surface 10 based on the model $l_2 = i_1 * k_1 * k_2 * n$. This output signal 35 will be representative of the luminescent message with background reflectivity compensation. The output signal 35 can then be processed to discern the contents of the message, whether through a bar code reading routine, character recognition routine, etc.

The mathematical model can be simplified with certain assumptions. One such assumption is if the background molecules 11, 12, 13 are uniformly reflective for a broad range of wavelengths, then $k_1 = k_2 = k$. While this assumption is particularly true for shades of white, grey or black, it can also be reasonably accurate for colors, particularly if the colors do not correspond to either the excitation light 15 or the luminescent light 17. With this assumption $l_2$ can be represented by the mathematical model $l_2 = i_1 * k^2 * n$.

Figure 3:
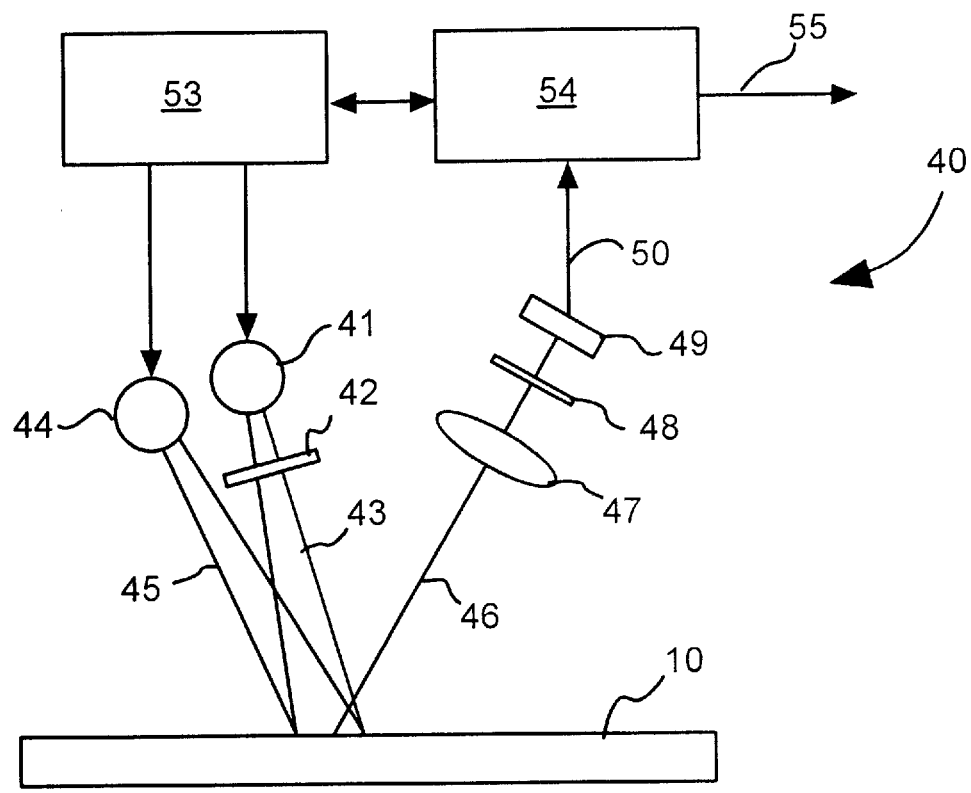
FIG. 3 depicts an alternative luminescent message reader that compensates for local variations in the reflectivity of the surface.

FIG. 3 illustrates a message reader 40 that can read a luminescent message on a surface 10 relying on the foregoing mathematical model. This message reader 40 is a slightly simplified version of the message reader 20, and shares many common features, components, and preferred embodiments. The apparatus 40 has a strobe light 41 for producing an incident light 43 adapted to impinge upon the surface 10. The incident light 43 includes a set of wavelengths that cause the message to luminesce and produce a luminescent light 17. The set of wavelengths in the incident light 43 substantially excludes the wavelengths of the luminescent light 17. Preferably, the incident light 43 is substantially limited to wavelengths of light that excite the luminescent message. The set of wavelengths can be controlled by an optical filter 42 interposed between the strobe light 41 and the surface 10 that allows only selected wavelengths of light to pass, however other suitable means may be employed. The message reader 40 also has a strobe light 44 for producing an incident light 45 to impinge upon the surface 10. The incident light 45 has a set of wavelengths that substantially exclude the wavelengths of light that cause the message to luminesce. Preferably, the incident light 45 substantially corresponds to the wavelengths of the luminescent light 17.

A focusing assembly 47 is disposed in the optical path 46 that is used for focusing light from the surface 10 into images. An optional filtering assembly 48 can be disposed in the optical path 46 to allow only wavelengths substantially similar to the luminescent light 18 to pass, which can be located on either side of the focusing assembly 47. An image sensor 49 having a plurality of photosensitive pixels is designed for receiving images from the surface 10 and converting the images into electric signals 50. A controlling system 53 controls the strobe lights 41, 44 and the image sensor 49, such that when the strobe light 41 is on a first image is converted into the electric signal 50 by the image sensor 49, and when the strobe light 44 is on a second image is converted into the electric signal 50 by the image sensor 49. A processing system 54 receives and processes the electric signals 50 from the image sensor 49. Preferably, the controlling system 53 controls the strobe lights 41, 44 such that the incident lights 43, 44 impinge upon the surface 10 at different times and in rapid succession.

Using the message reader 40, a luminescent message located on the surface 10 can be read with local variations in background reflectivity compensated. The controlling system 53 can trigger the strobe light 41 to flash while preventing the other strobe light 44 from illuminating. The incident light 43 will impinge upon the surface 10 and excite the luminescent message such that it produces a luminescent light 17. The reflected light 18 will emit along the optical path 46, pass through the focusing assembly 47 and the optional filtering assembly 47, and an image from the surface 10 will be received by the image sensor 49. The resulting electric signal 50 will be received by the processing system 54 and will be proportional to $l_2$, or the luminescent message without background reflectivity compensation.

Next, the controlling system 53 can trigger the strobe light 44 to flash while preventing the other strobe light 41 from illuminating. The incident light 45 will strike the surface 10. Since the incident light substantially excludes wavelengths that cause the message to luminesce, the message will not luminesce. The incident light 45 will reflect off the surface along the optical path 46, pass through the focusing assembly 47 and the optional filtering assembly 48, and an image will be received by the image sensor 49. The resulting electric signal 50 will be received by the processing system 54 and will be proportional to k, or the coefficient of reflectivity of the surface 10.

Preferably, the image received by the image sensor 49 will predominately correspond to the wavelengths of luminescent light 18, but some trace reflected excitation light 16 or other ambient light may also be received ("noise light"), which could interfere with the purity of the resulting electric signal 50 if the noise light is too intense. The noise light can be readily removed with the optional filtering assembly 48.

While the incident light 45 may contain a relatively broad range of wavelengths, it is preferred that the set wavelengths substantially correspond to the wavelengths of the luminescent light 17, particularly if the filter 48 is not used.

The processing system 54 will have received two electric signals: a first electric signal proportional to $l_2$ and a second electric signal proportional to k. As one with ordinary skill in the art will readily appreciate, the precise proportionality of the various electric signals can be calibrated, and the values for i, and n and be calculated in advance, so an output signal 55 can be generated to compensate for local variations in the reflectivity of the surface 10 based on the model $l_2 = i_1 * k^2 * n$. This output signal 55 will be representative of the luminescent message with local background reflectivity compensated. The output signal 55 can then be processed to discern the contents of the message, whether through a bar code reading routine, character recognition routine, etc.

The above-described methods for reading a luminescent message could also be implemented with a message reader similar to the Dolash reader where one or more of the lights 21, 24, 41, 44 is a scanning beam, such as a laser. The first scanning light would cause a first incident light to impinge on the surface 10 an excite the message such that it luminesces and produces a luminescent light 17. The reflected light 18 could then be received by a photoelectric sensor and converted into a first electric signal, which would be proportional to $l_2$. The second scanning light could cause a second incident light having a range of wavelengths substantially corresponding to the luminescent light 17 to impinge onto the surface 10. The reflected light from the second incident light could then be received by a photoelectric sensor and converted into a second electric signal, which would be proportional to k or $k_2$ (depending upon which mathematical model is being implemented). Naturally, if the model incorporating $k_2$ is used, a third electric signal proportional to $k_1$ would be required.

Figure 4:
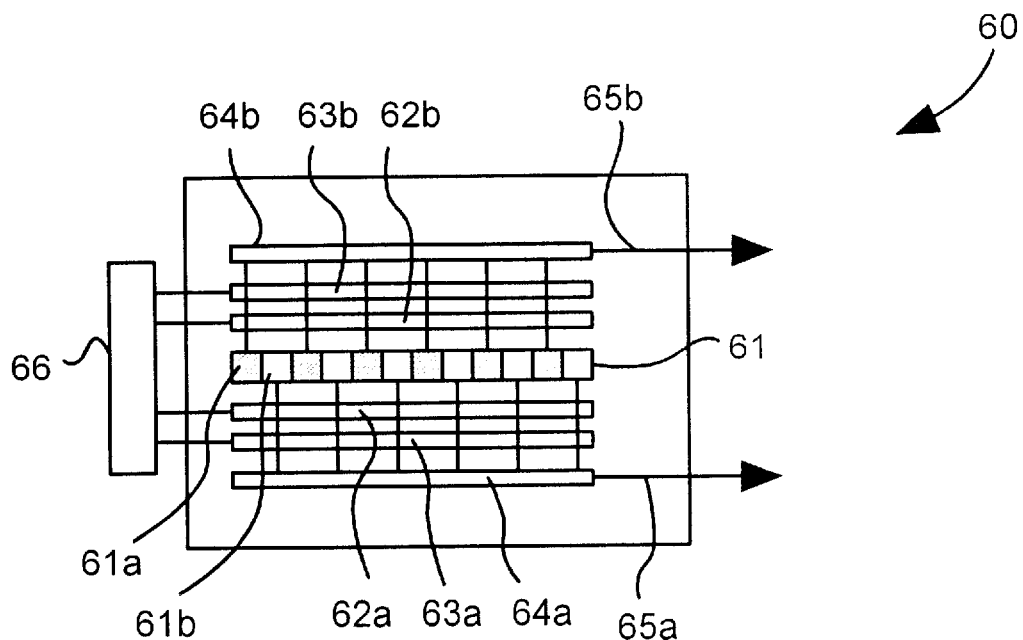
FIG. 4 shows an image sensor capable of receiving two images and generating two electric signals.

The image sensor 49 could be substituted with the image sensor 60 depicted in FIG. 4, which is adapted for receiving two images from the surface 10. The image sensor 60 is a linear CCD image sensor having a plurality of photodiodes 61 wherein odd 61a and even 62b pixels are interposed relative with respect to each other. In the interest of illustration, only 12 photodiodes are depicted in FIG. 4 (ordinarily hundreds or thousands of photodiodes would exist on such a sensor 60). Each set of pixels 61a, 61b has an independent storage electrode 62a, 62b, transfer gate 63a, 63b, and shift register 64a, 64b, such that separate electric signals 65a, 65b are generated corresponding to the images received by the respective set of pixels 61a, 61b. In ordinary image sensors, the storage electrodes 62a, 62b and transfer gates 64a, 64b are linked to operate in unison. If a control system 66 operates the storage electrodes 62a, 62b and transfer gates 64a, 64b independently, two separate images can be received resulting in two independent electric signals 65a, 65b. Preferably, the control system 66 functions as an electric shutter such that when the even pixels 61a are activated the odd pixels 61b are deactivated, and when the odd pixels 61b are activated the even pixels 61a are deactivated.

Working in conjunction with the control system 53, the even pixels could receive the luminescent image and generate the corresponding electric signal 65a proportional to $l_2$, and the odd pixels 61b could receive the reflected image and generate the corresponding electric signal 65b proportional to k. The two electric signals 65a, 65b could then be received by the processor 54 for processing. While shown in FIG. 4 as a CCD linear sensor, this odd/even pixel embodiment could readily be applied to other image sensors, whether linear or area, such as CMOS and CID sensors. When selecting an appropriate image sensor 60, one with ordinary skill in the art will readily appreciate that the images converted to the electric signals 65a, 65b will have half the resolution of the images converted to the electric signals 50 generated by the image sensor 49. Therefore, this resolution effect should be considered when selecting the number or pixels 61 in the sensor 60.

Figure 5:
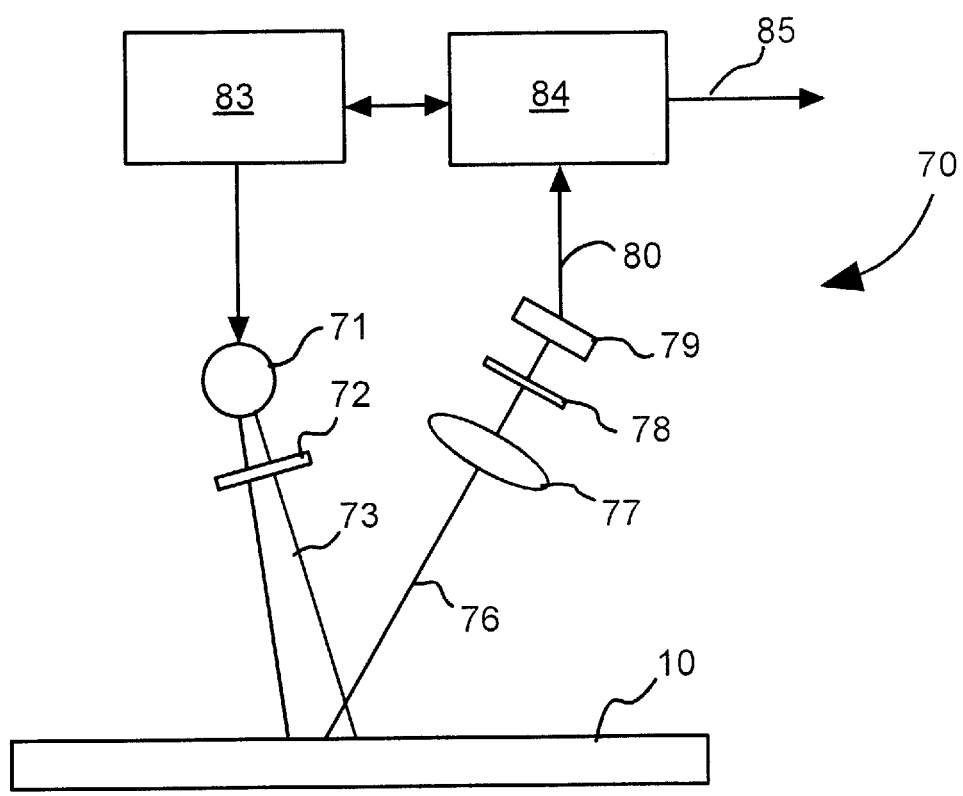
FIG. 5 depicts a luminescent message reader appropriate for reading messages on surfaces where surface reflectivity is substantially uniform.

In applications where the reflectivity of the surface 10 is substantially uniform across the message, the luminescent message reader 70 shown in FIG. 5 could be implemented. This message reader 70 is a simplified version of the message reader 20, and shares many common features, components, and preferred embodiments. The apparatus 70 has a light source 71, for producing an incident light 73 adapted to impinge upon the surface 10. Preferably, the light source 71 is a strobe light so images can be received from rapidly moving surfaces. Furthermore, a strobe light would tend to reduce noise light effects from ambient light. The incident light 73 includes a set of wavelengths that causes the message to luminesce and produce a luminescent light 17. This set of wavelengths substantially excludes the wavelengths corresponding to the luminescent light 17. Preferably, the incident light 73 is substantially limited to wavelengths of light that excite the luminescent message. The set of wavelengths can be controlled by a filter 72 interposed between the light 71 and the surface 10 that allows only selected wavelengths of light to pass, however other suitable means may be employed.

A focusing assembly 77 is disposed in the optical path 76, which is used for focusing light from the surface 10 into images. A filtering assembly 78, such as an optical filter, is disposed in the optical path 76, which can be located on either side of the focussing assembly 77, that blocks at least a portion of the incident light 73 reflected from the surface 10, and allows at least a portion of the luminescent light 18 to pass through the filtering assembly 78. Preferably, the amount of luminescent light 18 that passes through the filtering assembly 78 exceeds the amount of reflected light 73 that passes through. An image sensor 79 having a plurality of photosensitive pixels is designed for receiving images from the surface 10 and converting the images into electric signals 80. A controlling system 83 controls the light source 71 and the image sensor 79, such that when the light source 71 is on an image is converted into the electric signal 80 by the image sensor 79. A processing system 84 receives and processes the electric signal 80 from the image sensor 79.

Using the message reader 70, a luminescent message located on the surface 10 can be read. The controlling system 83 can trigger the light source 71 to illuminate and produce the incident light 73 that will impinge upon the surface 10 and excite the luminescent message such that it produces a luminescent light 17. The reflected light 18 will emit along the path 76, pass through the focusing assembly 77 and the filtering assembly 78, whereby an image of the message will be received by the image sensor 79. The resulting electric signal 80 will be received by the processing system 84 and will be proportional to $l_2$, or the luminescent message without background compensation.

The processing system 84 will have received one electric signal proportional to $l_2$. As one with ordinary skill in the art will readily appreciate, the precise proportionality of the electric signal 80 can be calibrated, and the values for $i_1$, n, and k can be calculated in advance, so an output signal 85 can be generated to compensate for the uniform reflectance of the surface 10 based on the model $l_2 = i_1 * k^2 * n$. The output signal 85 can then be processed to discern the contents of the message, whether through a bar code reading routine, character recognition routine, etc.

The foregoing description of the preferred embodiment of the invention has been presented for purposes of illustration and description. It is not intended to be exhaustive nor to limit the invention to the precise form disclosed. Many alternatives, modifications and variations will be apparent to those skilled in the art in light of the above teaching. Accordingly, this invention is intended to embrace all such alternatives, modifications and variations that fall within the spirit and broad scope of the appended claims.

I claim:

1. An apparatus for reading a message, said apparatus comprising:
   a. a first strobe light for producing a first incident light adapted to impinge upon a surface containing a luminescent message, said first incident light having a first set of wavelengths at least partially including a wavelength that causes the message to luminesce and produce a luminescent light, said first set of wavelengths substantially excluding the wavelengths of the luminescent light;
   b. a second strobe light for producing a second incident light to impinge upon the surface, said second incident light having a second set of wavelengths that substantially exclude wavelengths that cause the message to luminesce, wherein the second set of wavelengths substantially corresponds to the wavelengths of the luminescent light;
   c. at least one focusing assembly for focusing light from the surface onto a focal plane creating an image;
   d. at least one image sensor having a plurality of photosensitive pixels, said at least one image sensor being designed for receiving images from the surface and converting the images into electric signals;
   e. a controlling system for controlling the first and second strobe lights and the at least one image sensor, such that when the first strobe light is on a first image is converted into a first electric signal, and when the second strobe light is on a second image is converted into a second electric signal; and
   f. a processing system for receiving and processing the first and second electric signals from the at least one image sensor.

2. An apparatus as recited in claim 1, wherein the at least one image sensor includes a first image sensor having a plurality of photosensitive pixels from receiving the first image, and a second image sensor having a plurality of photosensitive pixels for receiving the second image.

3. An apparatus as recited in claim 2, wherein the first image sensor is the first set of pixels in an image sensor and the second image sensor is the second set of pixels in the image sensor, wherein the first and second set of pixels are alternatively interposed with respect to each other.

4. An apparatus as recited in claim 1, wherein the apparatus includes a single image sensor that alternates from receiving the first image to receiving the second image.

5. An apparatus as recited in claim 1, wherein one or more of the at least one image sensors is a CCD or CMOS sensor.

6. An apparatus as recited in claim 1, which the at least one image sensor is a linear or area sensor.

7. An apparatus as recited in claim 1, wherein the wavelengths of the luminescent light range from about 400 nm to about 5000 nm.

8. An apparatus as recited in claim 1, wherein the focusing assembly includes one or more lenses.

9. An apparatus as recited in claim 1, wherein the processing system includes an analog to digital converter and a digital processor.

10. An apparatus as recited in claim 1, wherein the first and second incident lights impinge the surface at different times.

11. An apparatus as recited in claim 1, wherein the controller is further designed for controlling the first and second strobe lights such that when the first strobe light in on a third image is converted into a third electric signal, and the processing system is further designed for processing the third electric signal.

12. An apparatus as recited in claim 1, wherein the luminescent message is a positive or negative image.

13. A method for reading a luminescent message on a surface, said method comprising the steps of:
   a. impinging onto the surface a first incident light that excites the message such that it luminescences and produces a luminescent light;
   b. converting the luminescent light into a first electric signal;
   c. impinging upon the surface a second incident light having a range of wavelengths that substantially correspond to the luminescent light;
   d. converting the second incident light reflected off the surface into a second electric signal; and
   e. processing the first and second electric signals to determine the content of the message.

14. A method as recited in claim 13, wherein the step of processing at least partially involves modifying the first electric signal based on the second electric signal.

15. A method as recited in claim 14, wherein the first electric signal is modified to compensate for the coefficient of reflectivity of the surface.

16. A method as recited in claim 14, further comprising the step of converting the first incident light reflected off the surface into a third electric signal.

17. A method as recited in claim 16, wherein the step of processing at least partially involves modifying the first electric signal based on the second and third electric signals.

18. A method as recited in claim 17, wherein the first electric signal is modified to compensate for (i) the coefficient of reflectivity of the surface for wavelengths corresponding to the luminescent light, and (ii) the coefficient of reflectivity of the surface for wavelengths corresponding to the first incident light.

19. A method as recited in claim 13, wherein the luminescent message is a positive or negative image.

20. An apparatus for receiving two images from a surface, said apparatus comprising:
   a. an image sensor having a first and second set of photosensitive pixels wherein the first and second set of pixels are alternatively interposed with respect to each other, said first set of pixels being designed for receiving a first image and converting the first image into a first electric signal, said even photosensitive pixels being designed for receiving a second image and converting the second image into a second electric signal;
   b. a focusing assembly adapted for focusing light from a surface onto a focal plane creating the first and second images;
   c. a controlling system for controlling the image sensor, such that when the first set of pixels are activated the second set of pixels are deactivated, and when the second set of pixels are activated the first set of pixels are deactivated; and d. a processing system for receiving and processing the first and second electric signals from the image sensor.

21. An apparatus as recited in claim 20, wherein the image sensor is a CCD or CMOS image sensor.

22. An apparatus as recited in claim 20, wherein the image sensor is a linear or area sensor.

23. An apparatus as recited in claim 20, wherein the first image corresponds to luminescent light from a message on the surface.

24. An apparatus as recited in claim 20, wherein the second image corresponds to light reflected off the surface.

25. An apparatus as recited in claim 20, wherein the processing system includes an analog to digital converter and a digital processor.

26. An apparatus as recited in claim 20, wherein the luminescent message is a positive or negative image.

27. An apparatus for reading a message, the apparatus comprising:

a) a first incident light impinging upon a surface containing a luminescent message, said first incident light comprising a first set of wavelengths that cause the message to luminesce and produce a luminescent light;

b) a second incident light impinging upon the surface having a second set of wavelengths substantially corresponding to the luminescent light;

c) a light sensor positioned so as to receive the light from the surface and convert such received light into electric signals;

d) a controlling system operative to coordinate the first and second incident lights and the light sensor such that the luminescent light is converted into a first electric signal and second incident light reflected from the surface is converted into a second electric signal; and e) a processing system for processing the first and second electric signals to compensate for the reflectivity of the surface and read the message.

28. An apparatus as recited in claim 27, further comprising a focusing assembly located between the sensor and the surface.

29. An apparatus as recited in claim 27, further comprising a filtering assembly that blocks wavelengths not corresponding to the luminescent light.

30. An apparatus as recited in claim 27, wherein the first and second incident lights are emitted from at least one strobe light.

31. An apparatus as recited in claim 27, wherein the first incident light substantially excludes the wavelengths of the luminescent light.

32. An apparatus as recited in claim 27, wherein the light sensor is a CCD or CMOS sensor.

33. An apparatus as recited in claim 27, wherein the light sensor is a linear or area sensor.

34. An apparatus as recited in claim 27, wherein the wavelengths of the luminescent light range from about 400 nm to about 5000 nm.

35. An apparatus as recited in claim 27, wherein the processing system includes, an analog to digital converter and a digital processor.

36. An apparatus as recited in claim 27, wherein the luminescent message is a positive or negative image.

* * * * *

UNITED STATES PATENT AND TRADEMARK OFFICE
CERTIFICATE OF CORRECTION

PATENT NO.   :   5,773,808
DATED        :   June 30, 1998
INVENTOR(S)  :   Vadim Laser It is certified that error appears in the above-identified patent and that said Letters Patent is hereby corrected as shown below:

Column 12, line 59 delete "even photosensitive" and replace with --second set of--.

Signed and Sealed this

Eighth Day of September, 1998

Attest:

BRUCE LEHMAN

Attesting Officer      Commissioner of Patents and Trademarks